(12) United States Patent
Urano et al.

(10) Patent No.: US 10,174,541 B2
(45) Date of Patent: Jan. 8, 2019

(54) CONTROL APPARATUS FOR OPENING AND CLOSING UNIT FOR VEHICLE

(71) Applicant: Mitsuba Corporation, Gunma (JP)

(72) Inventors: Yoshitaka Urano, Gunma (JP); Yoshitaka Sekine, Gunma (JP); Katsuhiro Tanino, Gunma (JP); Takayuki Ikeda, Gunma (JP); Arata Taniguchi, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 11 days.

(21) Appl. No.: 15/113,968

(22) PCT Filed: Jan. 23, 2015

(86) PCT No.: PCT/JP2015/051900
§ 371 (c)(1),
(2) Date: Jul. 25, 2016

(87) PCT Pub. No.: WO2015/111718
PCT Pub. Date: Jul. 30, 2015

(65) Prior Publication Data
US 2016/0340958 A1 Nov. 24, 2016

(30) Foreign Application Priority Data
Jan. 27, 2014 (JP) .................... 2014-012328

(51) Int. Cl.
*E05F 15/70* (2015.01)
*E05F 15/632* (2015.01)
(Continued)

(52) U.S. Cl.
CPC ............... *E05F 15/70* (2015.01); *B60J 5/047* (2013.01); *E05F 5/003* (2013.01); *E05F 15/632* (2015.01);
(Continued)

(58) Field of Classification Search
None
See application file for complete search history.

(56) References Cited

U.S. PATENT DOCUMENTS

| | | | | |
|---|---|---|---|---|
| 4,862,640 A | * | 9/1989 | Boyko | ..................... B60J 5/06 49/213 |
| 4,973,894 A | | 11/1990 | Johansson | |

(Continued)

FOREIGN PATENT DOCUMENTS

| | | |
|---|---|---|
| CN | 101388633 A | 3/2009 |
| CN | 102149890 A | 8/2011 |

(Continued)

OTHER PUBLICATIONS

International Search Report for International Application No. PCT/JP2015/051900 dated Apr. 8, 2015.

*Primary Examiner* — Catherine A Kelly
(74) *Attorney, Agent, or Firm* — McCormick, Paulding & Huber LLP

(57) ABSTRACT

When a main switch (82) is in an on-state, a controller (80) allows an electric motor (41) to drive a sliding door to open and close an opening, and when the main switch (82) is in an off-state and a half latch switch (66) is in an on-state, the controller (80) performs a braking control to allow the electric motor (41) to generate a braking force. When the main switch (82) is in the on-state, the sliding door can be opened and closed automatically. When the main switch (82) is in the off-state and the sliding door is closed manually, the improperly-closed state detecting switch is switched on before a full-latch state, the controller performs a braking control of the driving source. In this manner, damage to components caused by the inertial force of the driving source which results from an abrupt stop of the opening and closing unit can be certainly prevented without enhancing the rigidity of a casing, etc.

4 Claims, 9 Drawing Sheets

(51) Int. Cl.
*E05F 15/643* (2015.01)
*B60J 5/04* (2006.01)
*E05F 5/00* (2017.01)
*H02P 3/18* (2006.01)
*H02P 3/26* (2006.01)
*H02P 6/24* (2006.01)

(52) U.S. Cl.
CPC .............. *E05F 15/643* (2015.01); *H02P 3/18* (2013.01); *H02P 3/26* (2013.01); *H02P 6/24* (2013.01); *E05Y 2201/21* (2013.01); *E05Y 2201/22* (2013.01); *E05Y 2201/434* (2013.01); *E05Y 2201/654* (2013.01); *E05Y 2201/672* (2013.01); *E05Y 2400/32* (2013.01); *E05Y 2400/36* (2013.01); *E05Y 2900/531* (2013.01)

(56) References Cited

U.S. PATENT DOCUMENTS

| | | | | |
|---|---|---|---|---|
| 6,037,727 | A * | 3/2000 | Kawanobe | E05F 15/632 318/286 |
| 6,369,537 | B1 * | 4/2002 | Vordermaier | B60J 7/0573 318/280 |
| 6,577,483 | B1 * | 6/2003 | Steicher | H02P 3/18 318/370 |
| 7,267,391 | B2 * | 9/2007 | Yokomori | B60J 5/06 296/155 |
| 7,560,884 | B2 * | 7/2009 | Shu | H02P 3/18 318/375 |
| 7,698,855 | B2 * | 4/2010 | Imai | E05F 15/40 296/155 |
| 7,928,678 | B2 * | 4/2011 | Imai | E05F 15/632 296/155 |
| 9,260,901 | B2 * | 2/2016 | Ishida | B60J 5/06 |
| 9,397,604 | B2 * | 7/2016 | Oakley | H02P 29/0055 |
| 2004/0020126 | A1 | 2/2004 | Matsui et al. | |
| 2015/0061561 | A1 * | 3/2015 | Roppongi | H02P 6/24 318/470 |

FOREIGN PATENT DOCUMENTS

| | | |
|---|---|---|
| CN | 102687385 A | 9/2012 |
| CN | 103277002 A | 9/2013 |
| JP | H10-196220 A | 7/1998 |
| JP | 2001-152746 A | 6/2001 |
| JP | 2002-227944 A | 8/2002 |

* cited by examiner

FIG. 8

|  | Without Braking Control | With Braking Control |
|---|---|---|
| Maximum Rotation Number (rpm) of Rotor | 4,840 | 2,432 |
| Maximum Speed (m/s) of Door | 1.3 | 0.7 |
| Maximum Tension (N) of Cable | 1,174 | 613 |

CONTROL APPARATUS FOR OPENING AND CLOSING UNIT FOR VEHICLE

CROSS REFERENCE TO RELATED APPLICATION

Applicant hereby claims foreign priority benefits under U.S.C. § 119 from International Patent Application Serial No. PCT/JP2015/051900 filed on Jan. 23, 2015 and Japanese Patent Application No. 2014-012328 filed on Jan. 27, 2014, the contents of all of which are incorporated by reference herein.

TECHNICAL FIELD

The present invention relates to a control apparatus for controlling an opening and closing unit for vehicle, which opens and closes an opening of a vehicle.

BACKGROUND ART

Conventionally, a relatively large opening is provided to a side part of a vehicle such as for example station wagon and minivan, and allows an occupant to easily get on and off the vehicle via the opening, or allows a baggage to be put in and taken out of the vehicle via the opening. This opening is opened and closed with a sliding door (opening and closing unit) provided with a roller assembly. Since the sliding door is heavy in weight, the vehicle equipped with the sliding door is provided with a sliding door opening and closing mechanism capable of automatically opening and closing the sliding door.

The sliding door opening and closing mechanism is provided with a guide rail, thereby rolling the roller assembly along the guide rail to guide the sliding door. This guide rail extends in a longitudinal direction of the vehicle, and it is disposed in the vicinity of the opening. The guide rail is provided with a pull-in portion disposed on the front side of the vehicle and curved inward from the side part of the vehicle, and therefore, the sliding door is drawn into the opening so as to reach a fully-closed state just before the sliding door fully close the opening.

Pulleys for changing the direction of cables for pulling the sliding door in an opening direction and in a closing direction are respectively provided to a front side and a rear side of the guide rail. An end of each cable changed in direction is wound around a drum of a driving unit. The driving unit is driven so as to move the cables by rotating the drum in clockwise and counterclockwise directions, thereby pulling the sliding door in the opening direction or the closing direction.

For example, Japanese Patent Application Laid-Open Publication No. 2002-227944 (FIG. 1) discloses a technique (cable driving device) known as a sliding door opening and closing mechanism. The cable driving device described in Japanese Patent Application Laid-Open Publication No. 2002-227944 (FIG. 1) is provided with: an actuator (driving unit) which has an electric motor (driving source); and a drum which is rotated clockwise and counterclockwise by the electric motor. When the sliding door is opened and closed manually without being driven by the electric motor, the electric motor is rotated depending on the rotation of the drum.

SUMMARY

According to the cable driving apparatus disclosed in Japanese Patent Application Laid-Open Publication No. 2002-227944 (FIG. 1), for example, when the sliding door is manually moved at high speed in the closing direction so as to quickly close the sliding door, and comes to a abrupt stop, the cables connected to the sliding door are brought to a abrupt stop. As a result, an inertial force of the electric motor rotated at high speed generates a large load to be applied to such a component as speed-reduction mechanism forming part of the actuator. In order to prevent such a large load from damaging the actuator, the rigidity of the actuator must be enhanced by, for example, increasing the wall-thickness of the casing of the actuator. Such enhancement in rigidity of the actuator constitutes an obstacle to a reduction in size and weight of the cable driving device, and is therefore not considered to be a desired measure.

An object of the present invention is to provide a control apparatus which controls an opening and closing unit for vehicle to perform a braking control of a diving source when the opening and closing unit is manually closed, thereby certainly preventing damage to its component caused by the inertial force of the driving source.

According to one aspect of the present invention, there is provided a control apparatus for controlling an opening and closing unit for vehicle, comprising: a driving source for driving the opening and closing unit which opens and closes an opening of the vehicle; a controller for controlling the driving source; a main switch connected to the controller, and an improperly-closed state detecting switch connected to the controller, and adapted to detect an improperly-closed state of the opening and closing unit with respect to the opening, wherein when the main switch is in an on-state, the controller allows the driving source to drive the opening and closing unit to open and close the opening, and when the main switch is in an off-state and the improperly-closed state detecting switch is in an on-state, the controller performs a braking control to cause the driving source to generate a braking force.

According to another aspect of the present invention, the controller is connected to a travel speed detecting unit for detecting a travel speed of the opening and closing unit, and when the value of a detection signal from the travel speed detecting unit is equal to or larger than a predetermined value, the controller performs the braking control.

According to still another aspect of the present invention, the driving source is an electric motor having a plurality of coils, a driving circuit for driving the electric motor has a power supply, a plurality of first switching elements connected to a positive side of the power supply, and a plurality of second switching elements connected to a negative side of the power supply, the controller performs the braking control by switching on all the first switching elements or all the second switching elements.

According to still another aspect of the present invention, the driving source is an electric motor having a plurality of coils, a rotor, and a rotation sensor for detecting the rotation position of the rotor with respect to the coils, a driving circuit for driving the electric motor has a power supply, a plurality of first switching elements connected to the positive side of the power supply, and a plurality of second switching elements connected to the negative side of the power supply, the controller performs the braking control by switching on the first switching element and second switching element to supply a current to a coil corresponding to the rotation position of the rotor.

According to the present invention, when the main switch is in an on-state, the controller allows the electric motor to drive the sliding door to open and close an opening, and when the main switch is in an off-state and the half latch switch is in an on-state, the controller performs a braking control to allow the electric motor to generate a braking force. Therefore, when the main switch is in the on-state, the sliding door can be opened and closed automatically. On the other hand, when the main switch is in the off-state and the sliding door is closed manually, the improperly-closed state detecting switch is switched on before a full-latch state, so that the controller performs a braking control of the driving source. Through this process, damage to a component caused by the inertial force of the driving source which results from an abrupt stop of the opening and closing unit can be certainly prevented without enhancing the rigidity of a casing, etc.

BRIEF DESCRIPTION OF THE DRAWINGS

FIG. 8 is a comparison table showing numerical values which compare the case of performing braking control with the case of not performing the braking control.

DETAILED DESCRIPTION

Figure 1:
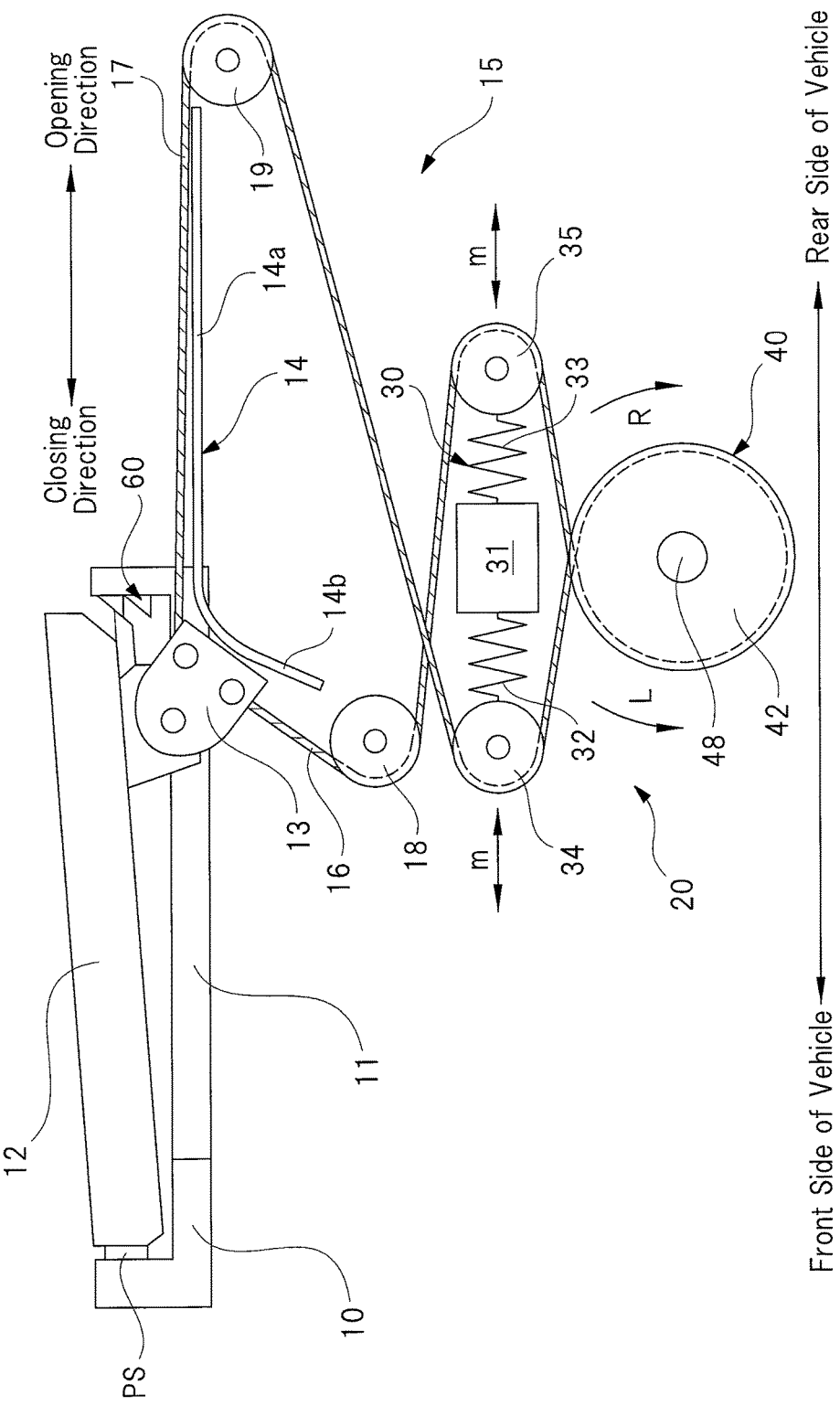
FIG. 1 is an explanatory diagram explaining an outline of a sliding door opening and closing mechanism.
Figure 2:
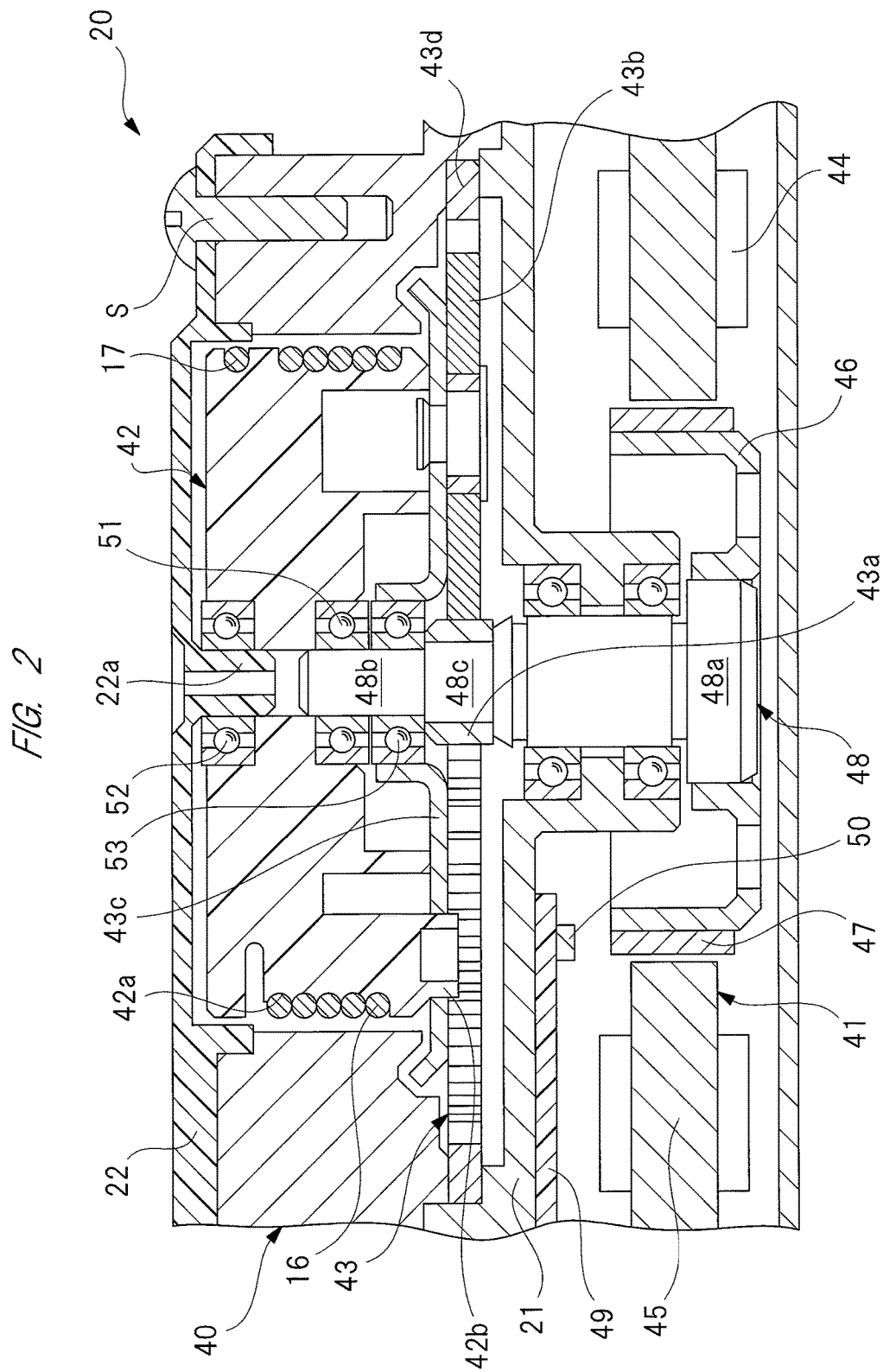
FIG. 2 is a partial sectional view of a diving unit.
Figure 4:
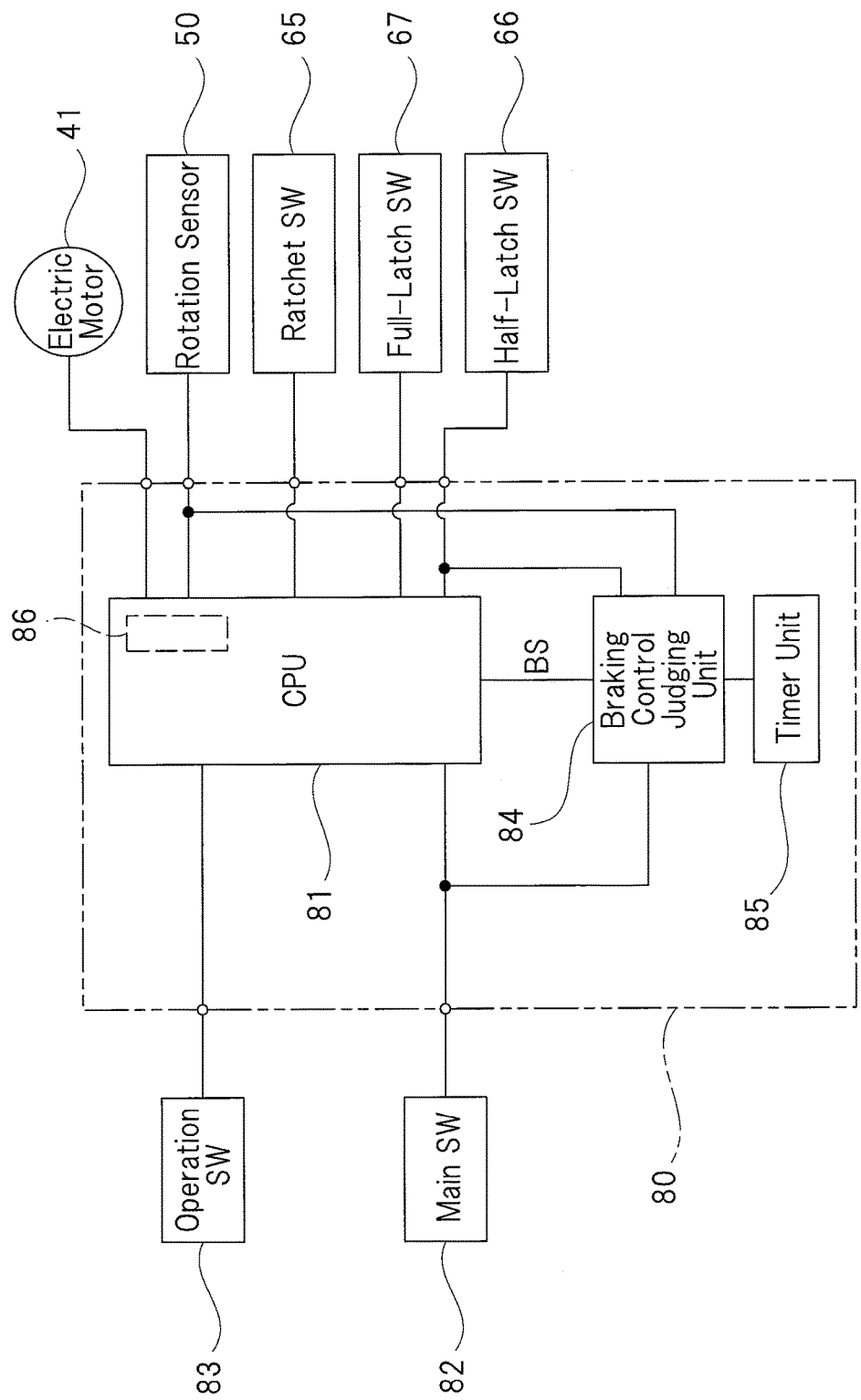
FIG. 4 is a block diagram showing a configuration of a control apparatus according to the present invention.
Figure 5:
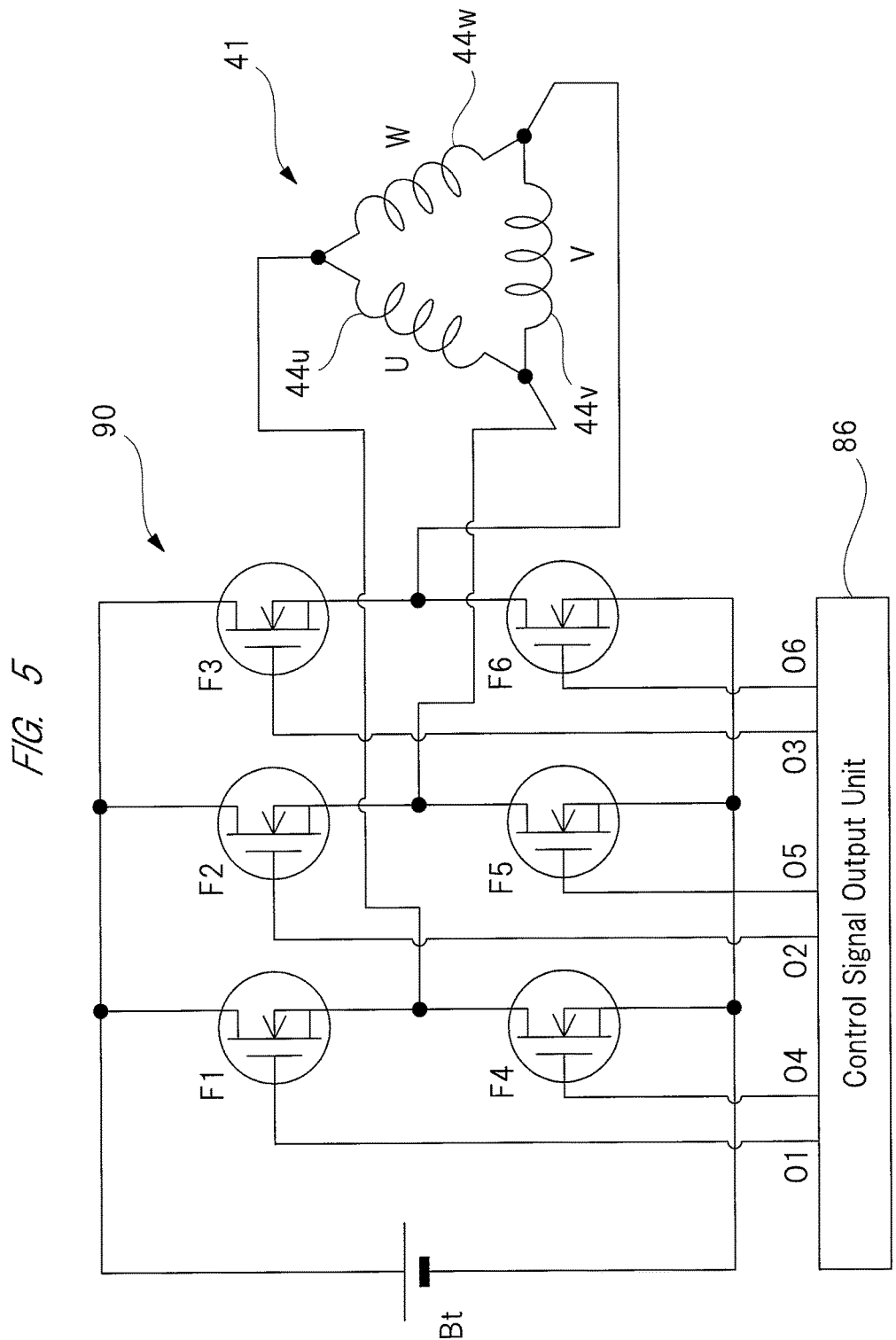
FIG. 5 is a circuit diagram explaining the electric system of an electric motor.

Hereinafter, embodiments of the present invention will be described in detail with reference to the accompanying drawings.
FIG. 1 is an explanatory diagram explaining an outline of a sliding door opening and closing mechanism, FIG. 2 is a partial sectional view of a diving unit, FIGS. 3A to 3C are explanatory diagrams each explaining an operation of a door lock device, FIG. 4 is a block diagram showing a configuration of a control apparatus according to the present invention, and FIG. 5 is a circuit diagram explaining the electric system of an electric motor.

As shown in FIG. 1, a sliding door (opening and closing unit) 12 is provided to a side part 10 of a minivan-like vehicle (not shown), and adapted to open and close an opening 11 formed on the side part 10. The sliding door 12 is fitted with a roller assembly 13, and guided by a guide rail 14 extending in a longitudinal direction of the vehicle. In other words, the sliding door 12 is guided by the guide rail 14 so as to move in the longitudinal direction of the vehicle.

The guide rail 14 has: a linear portion 14a extending in the longitudinal direction of the vehicle and a pull-in portion 14b extending in the width direction of the vehicle, i.e., the direction intersecting with the longitudinal direction of the vehicle (vertical direction in FIG. 1). The pull-in portion 14b is disposed closer to the front part of the vehicle than the linear portion 14a, that is, close to the opening 11, and is formed in such a way as to extend from the side part 10 toward the vehicle interior (lower side in FIG. 1). The pull-in portion 14b is formed into an almost arc shape. As a result, when the sliding door 12 is about to be fully closed, the roller assembly 13 rolls along the pull-in portion 14b, which guides the sliding door 12 into the opening 11 to put the sliding door 12 in a fully-closed state.

On the vehicle interior side to the side part 10, a sliding door opening and closing mechanism 15 is disposed, which opens and closes the sliding door 12. The sliding door opening and closing mechanism 15 includes a pair of cables 16 and 17, a pair of pulleys 18 and 19, a driving unit 20, and a door lock device 60.

Each of the cables 16 and 17 has one end connected to the roller assembly 13 of the sliding door 12. The pulleys 18 and 19 are respectively arranged on the front and rear sides of the guide rail 14, respectively closer to the vehicle front and the vehicle rear, and adapted to change the directions of the cables 16 and 17. The driving unit 20 hauls the cables 16 and 17 and is disposed on the vehicle interior side to the guide rail 14. The door lock device 60 causes the sliding door 12 to automatically move into a full-latch state (fully-closed state) when the sliding door 12 caused to make a closing move is in a half-latch state (improperly closed state) with respect to the opening 11.

The driving unit 20 has a tensioner mechanism 30 and an "electric motor with speed-reduction mechanism" 40). As shown in FIG. 1, the tensioner mechanism 30 has a spring support block 31 fixed to a housing 21 of the driving unit 20 (see FIG. 2). A pair of coil springs 32 and 33 is respectively arranged on both longitudinal sides (left and right in FIG. 1) of the spring support block 31. A pair of tensioner pulleys 34 and 35 is respectively attached to one ends of coil springs 32 and 33, which are opposite to the other ends closer to the spring support block 31, and the tensioner pulleys 34 and 35 are capable of moving in a direction indicated by an arrow "m" in FIG. 1.

The cables 17 and 16 are put over the tensioner pulleys 34 and 35, respectively, which rid the cables 17 and 16 of slacks. In addition to this function of ridding the cables 16 and 17 of slacks, the tensioner mechanism 30 also has a function of preventing damage to the "electric motor with speed-reduction mechanism" 40 that is caused by a large load transmitted from the sliding door 12 through the cables 16 and 17 to the "electric motor with speed-reduction mechanism" 40 when the sliding door 12 is manually operated.

FIG. 2 is a sectional view of the "electric motor with speed-reduction mechanism" 40 forming part of the driving unit 20. The "electric motor with speed-reduction mechanism" 40 has an electric motor 41 serving as a driving source, a drum 42, and a speed-reduction mechanism 43, which are housed in the housing 21 forming the enclosure of the driving unit 20. An opening (upper side in FIG. 2) of the housing 21 is closed with a cover 22 fixed to the housing 21 with a fixing screw "S".

The electric motor 41 is a three-phase brushless motor having coils 44 corresponding to a U-phase, a V-phase, and a W-phase, and the electric motor has an almost disc-shaped stator core (stator) 45 fixed to the housing 21. The stator core 45 is wound with the coils 44 of three phases interconnected by delta wiring (see FIG. 5). Radially inside the stator core 45, a rotor 46 is disposed rotatably via a given minute (air) gap between the stator core 45 and the rotor 46.

The rotor 46 is formed by press working a steel plate, etc. into an almost annular shape, and has an almost U-shaped section. To the radial exterior of the rotor 46, a cylindrical permanent magnet 47 is fixed, which has a plurality of magnet poles arranged along the circumference of the rotor 46. The permanent magnet 47 is counter to the radial interior of the stator core 45. As a result, when a driving current is supplied in sequence to the coils 44 of three phases, the rotor 46 rotates.

The large-diameter base end 48a of a rotor shaft 48 is fixed to the radial interior of the rotor 46, so that the rotor shaft 48 rotates together with the rotating rotor 46. The housing 21 having a control board 49 housed therein is mounted with a rotation sensor 50 for detecting the rotation state of the rotor 46. This rotation sensor 50 is set so as to face the permanent magnet 47 along the axial direction of the rotor shaft 48. In this arrangement, the rotation sensor 50 detects a shift in the magnetic poles of the permanent magnet 47, that is, detects the rotation position of the rotor 46 with respect to the coils 44 (stator core 45).

In addition, the rotation sensor 50 is electrically connected to a controller 80 (see FIG. 4). A detection signal from the rotation sensor 50 is therefore output to the controller 80. On the basis of the detection signal from the rotation sensor 50, the controller 80 recognizes the high rotating speed of the rotor 46 when finding that the magnetic poles shift at high speed per unit time, and identifies the rotation position of the rotor 46 by counting shifts in the magnetic poles.

One side (lower side in FIG. 2) of the drum 42 in its axial direction is rotatably attached to the small-diameter front end 48b of the rotor shaft 48 via a first bearing 51, while the other side (upper side in FIG. 2) of the drum 42 in its axial direction is rotatably supported by a support shaft 22a of the cover 22 via a second bearing 52. In other words, the drum 42 is rotatably supported by the small-diameter front end 48b and the support shaft 22a, which are axially aligned with each other, via the first and second bearings 51 and 52. In this manner, two end parts of the drum 42 along a thickness direction thereof are supported, thereby effectively suppressing the shakiness of the drum 42 when the drum 42 is in a rotating state. This reduces the operation noise of the driving unit 20.

The other ends of the cables 16 and 17 are fixed to the drum 42, and a helical groove 42a for reeling up the cables is formed on the outer periphery of the drum 42. The cables 16 and 17 led to the inside of a housing 21 are wound around the drum 42 several times along its helical groove 42a such that the cables 16 and 17 are set reverse in direction to each other.

As shown in FIG. 1, when the drum 42 is rotated in an arrowed direction "R" (clockwise), the opening cable 17 is reeled up onto the drum 42 as the closing cable 16 is sent out from the drum 42. As a result, the sliding door 12 is pulled by the opening cable 17, and therefore moved in the opening direction (indicated by an arrow in FIG. 1). When the drum 42 is rotated in an arrowed direction "L" (counterclockwise), in contrast, the closing cable 16 is reeled up onto the drum 42 as the opening cable 17 is sent out from the drum 42. As a result, the sliding door 12 is pulled by the closing cable 16, and therefore moved in the closing direction (indicated by the arrow in FIG. 1).

As shown in FIG. 2, between the electric motor 41 and the drum 42 along the axial direction of the rotor shaft 48, a speed-reduction mechanism 43 composed of a planetary gear mechanism is disposed. The speed-reduction mechanism 43 includes a sun gear 43a, three planetary gears 43b (only one of which is shown in FIG. 2), a carrier 43c supporting the planetary gears 43b, and a ring gear 43d.

The sun gear 43a is fixed to the intermediate fixing portion 48c of the rotor shaft 48, and the ring gear 43d is fixed to the housing 21. Three planetary gears 43b are arranged between the sun gear 43a and the ring gear 43d along the radial direction of the speed-reduction mechanism 43, and each of the planetary gears 43b is engaged with the sun gear 43a, and engaged with the ring gear 43d.

The carrier 43c rotatably supports the three planetary gears 43b at equal intervals (120-degree intervals). The radial interior of the carrier 43c is rotatably supported by the small-diameter front end 48b of the rotor shaft 48 via a third bearing 53. The carrier 43c is connected to a projecting pin 42b of the drum 42, so that the drum 42 rotates together with the carrier 43c. The rotating speed of the sun gear 43a is reduced to a given rotating speed, which process turns a torque from the sun gear 43a into a high torque. This high torque is transmitted through the carrier 43c to the drum 42.

Here, only the speed-reduction mechanism 43 is provided between the electric motor 41 and the drum 42, and this means that an electromagnetic clutch and the like capable of cutting off power transmission between the electric motor 41 and the drum 42 is not provided between the electric motor 41 and the drum 42. Thus, it is possible to achieve a reduction in size and weight of the driving unit 20, and to realize simplified control logic for the driving unit 20.

In this manner, because the driving unit 20 is not provided with an electromagnetic clutch, etc., a torque transmitted from the cables 16 and 17 to the drum 42 is transmitted to the electric motor 41. Specifically, as shown in FIG. 1, when the sliding door 12 is manually opened or closed, the electric motor 41 rotates at high speed as the sliding door 12 moves to its opened or closed position.

The speed-reduction mechanism 43 is provided as a planetary gear mechanism, the electric motor 41 is provided as a three-phase brushless motor, and the speed-reduction mechanism 43, the electric motor 41, and the drum 42 are arranged coaxial with each other. This configuration allows the sliding door 12 to be manually opened and closed smoothly.

Figure 3:
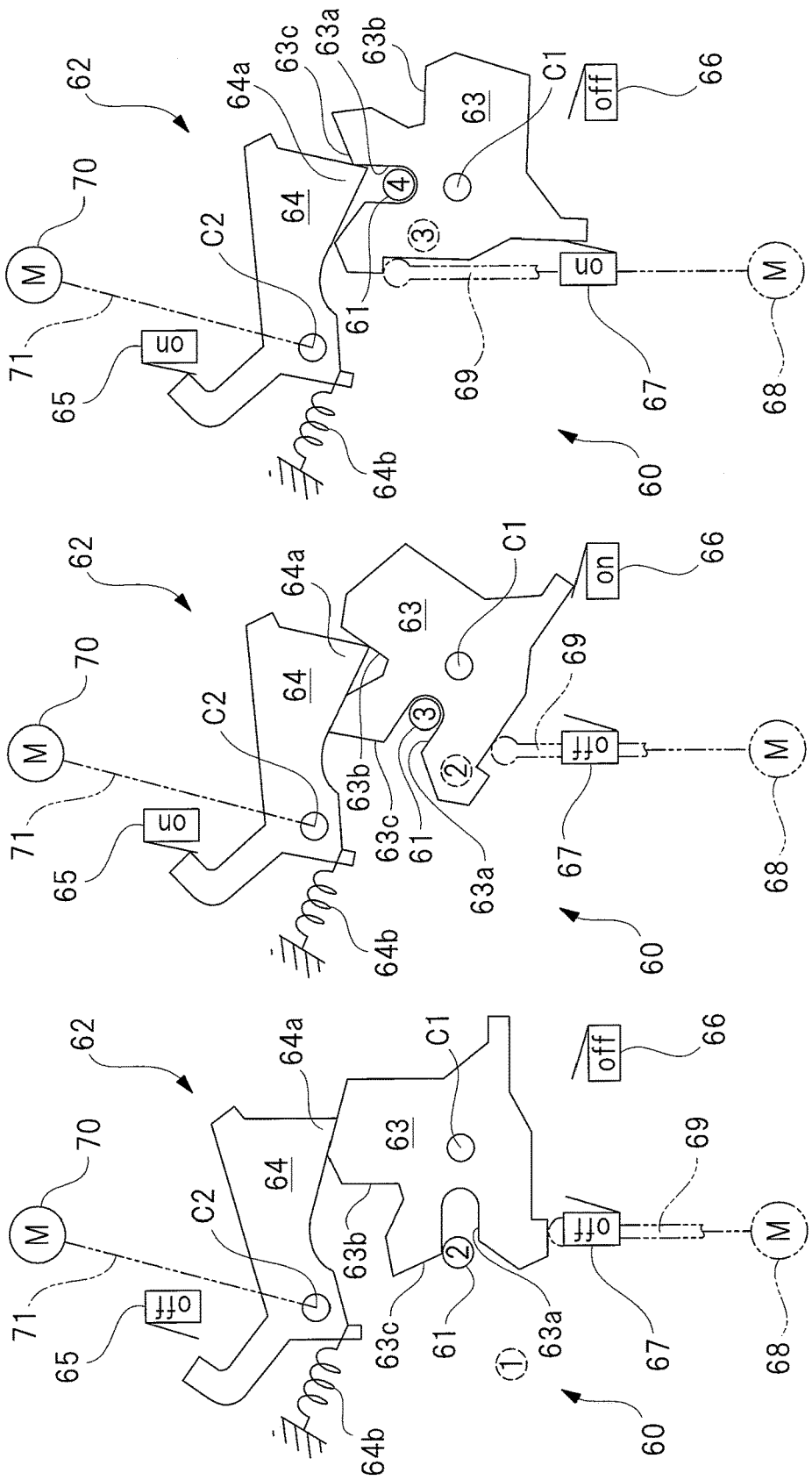
FIGS. 3A to 3C are explanatory diagrams each explaining an operation of a door lock device.

FIG. 3 diagrammatically shows the door lock device 60, which is composed of: a striker 61 disposed on the side part 10 of the vehicle; and a latch mechanism 62 disposed inside the sliding door 12. Here, the locations of the striker 61 and the latch mechanism 62 may be switched, in which case the striker 61 and the latch mechanism 62 are disposed inside the sliding door 12 and on the side part 10, respectively.

The striker 61 is made by bending a steel bar with an almost circular section into an almost U-shape (not shown). The latch mechanism 62 has a latch member 63 capable of rotating around a pivot C1. The latch member 63 has a notch 63a which is formed so that the striker 61 slips into the notch 63a when the sliding door 12 is closed. The latch member 63 is kept pushed in the counterclockwise direction in FIG. 3, by a coil spring (not shown) but is rotated clockwise after the striker 61 slips into the notch 63a.

The latch member 63 has a first ratchet engaging portion 63b and a second ratchet engaging portion 63c. With each of the ratchet engaging portions 63b and 63c, the front end 64a of a ratchet lever 64 moves to engage. This engagement prevents the latch member 63 from rotating in an unlocking direction (counterclockwise). The ratchet lever 64 is rotated around a pivot C2, and kept pushed in a direction (clockwise direction) in which the front end 64a is engaged with each of the ratchet engaging portions 63b and 63c.

Since the ratchet lever 64 is connected to the door handle (not shown) of the sliding door 12, an operation of this door handle causes the ratchet lever 64 to rotate in a direction (counterclockwise direction) in which the front end 64a is disengaged from each of the ratchet engaging portions 63b and 63c.

A ratchet switch 65 is disposed in the vicinity of the ratchet lever 64, and switches on when the front end 64a is engaged with the ratchet engaging portion 63b or 63c. In addition, a half-latch switch (improperly-closed state detecting switch) 66 is disposed in the vicinity of the latch member 63, and switches on when the front end 64a is engaged with the first ratchet engaging portion 63b to take the half-latch state. Furthermore, a full-latch switch (full closing detection switch) 67 is disposed in the vicinity of the latch member 63, and switches on when the front end 64a is engaged with the second ratchet engaging portion 63c to take the full-latch state.

Specifically, the half-latch switch 66 detects the half-latch state (improperly-closed state) of the sliding door 12 with respect to the opening 11, while the full-latch switch 67 detects the full-latch state (full closing state) of the sliding door 12 with respect to the opening 11.

Next, timing of switching on and off the ratchet switch 65, half-latch switch 66, and full-latch switch 67 will be described when the operation of the sliding door opening and closing mechanism 15 is described with reference to FIGS. 3 and 7.

The door lock device 60 is provided with a closure 69 that is reciprocated by a driving motor 68 to rotate the latch member 63 from its half-latch position to full-latch position. Rotating the driving motor 68 clockwise to cause the closure 69 to stick up to the latch member 63 causes the latch member 63 to rotate in a full-latch direction (clockwise) and therefore puts the latch member 63 into the full-latch state. Afterward, the driving motor 68 is rotated in the reverse direction to put the closure 69 back into its initial position.

The door lock device 60 is provided also with a releaser 71 (not shown in detail) that is driven by a driving motor 70 to disengage the front end 64a of the ratchet lever 64 from each of the ratchet engaging portions 63b and 63c. Specifically, rotating the driving motor 70 in the normal direction puts the releaser 71 into action, which causes the ratchet lever 64 to rotate counterclockwise against the spring force of the coil spring 64b. As a result, the front end 64a is disengaged from each of the ratchet engaging portions 63b and 63c.

The sliding door opening and closing mechanism 15 is controlled by the controller 80 of FIG. 4. The controller 80 has a CPU 81 that executes a given computing process, based on incoming various detection signals, etc., to control the rotation of the electric motor 41 serving as a driving source. The CPU 81 is electrically connected to each of the electric motor 41, rotation sensor 50, ratchet switch 65, half-latch switch 66, and full-latch switch 67 that make up the sliding door opening and closing mechanism 15, via an interface (not shown in detail) of the controller 80.

The CPU 81 is electrically connected also to a main switch 82 and to an operation switch 83, via the interface of the controller 80. These main switch 82 and operation switch 83 are switches operated by a driver, occupant, etc., and are disposed on the periphery of an instrument panel (not shown) in the vehicle interior and the door handle of the sliding door 12, respectively.

Switching the main switch 82 on allows automatic control over the sliding door 12 by the operation switch 83 incorporated in the door handle. Switching the main switch 82 off, on the other hand, allows manual control over the sliding door 12.

In addition to the CPU 81, the controller 80 also has a braking control judging unit 84 and a timer 85. The braking control judging unit 84 receives incoming on/off signals from the main switch 82, a detection signal from the rotation sensor 50, and on/off signals from the half-latch switch 66. Based on these incoming signals, the braking control judging unit 84 judges whether or not to perform braking control of the electric motor 41, and sends the result of the judgment to the CPU 81.

Here, the braking control judging unit 84 is electrically connected to the timer 85 which measures a time having elapsed from a point at which the braking control judging unit 84 makes a judgment of performing braking control of the electric motor 41. The timer 85 transmits a time-counting signal indicative of an elapse of a given time t5 (see FIG. 7), to the braking control judging unit 84, which suspends braking control of the electric motor 41 based on the incoming time-counting signal.

The CPU 81 has incorporated therein a control signal output unit 86 which outputs a control signal to a driving circuit 90 (see FIG. 5) of the electric motor 41. On the basis of a computation result from the CPU 81, the control signal output unit 86 controls the driving circuit 90, thereby controlling the electric motor 41 to rotate it in a given direction at a given rotation number, or performing a braking control to cause the electric motor 41 to generate a braking force.

As shown in FIG. 5, the driving circuit 90 of the electric motor 41 is mounted on a control board 49 (see FIG. 2) disposed inside the driving unit 20. The driving circuit 90 is supplied with power from a power supply Bt which is a battery (not shown) incorporated in the vehicle, and has a plurality of first switching elements F1, F2, and F3 arranged on the positive side (upper side in FIG. 5) to the power supply Bt and a plurality of second switching elements F4, F5, and F6 arranged on the negative side (lower side in FIG. 5) to the power supply Bt.

In this embodiment, the first switching elements F1, F2, and F3 are combined with the respective second switching elements F4, F5, and F6 so as to constitute three pairs of groups each including two switching elements, and each of the switching elements F1 to F6 is provided as a MOSFET. However, the present invention is not limited to three pairs of groups, and for example, switching elements may constitute a five pairs of groups.

Control signals O1 to O6 from the control signal output unit 86 are respectively input to the switching elements F1 to F6 at given timing. In this manner, the switching elements F1 to F6 are switched on and off in sequence at high speed (switching). As a result, the U-phase, V-phase, and W-phase coils 44 of the electric motor 41 are supplied with current in sequence, which causes the rotor 46 (see FIG. 2) of the electric motor 41 to rotate. Hereinafter, as shown in FIG. 5, the coils 44 corresponding to the U-phase, V-phase, and W-phase will be respectively defined as "U-phase coil 44u", "V-phase coil 44v", and "W-phase coil 44w".

Next, the basic operation of the electric motor 41 will be described in detail. In order to cause the electric motor 41 to rotate, a driving current must be supplied to the U-phase coil 44u, the V-phase coil 44v, and the W-phase coil 44w in sequence through switching. However, the rotation of the rotor 46 may fail to follow sequential supply of the driving current to the U-phase coil 44u, V-phase coil 44v, and W-phase coil 44w if an excessive load is applied to the electric motor 41. In order to prevent such a situation, the rotation sensor 50 monitors the rotation state of the rotor 46, and on the basis of the monitoring result, timing of switching the driving current to be supplied to the U-phase coil 44u, V-phase coil 44v, and W-phase coil 44w is adjusted to synchronize the supply of the driving current with the rotation of the rotor 46.

In order to rotate the electric motor 41, for example, the first switching element F1 and the second switching element F5 are switched on to supply the driving current to the U-phase coil 44u. Then, the first switching element F2 and the second switching element F6 are switched on to supply the driving current to the V-phase coil 44v. Furthermore, the first switching element F1 and the second switching element F6 are switched on to supply the driving current to the W-phase coil 44w. In this manner, the driving current is supplied in sequence to the U-phase coil 44u, V-phase coil 44v, and W-phase coil 44w. As a result, an electromagnetic force is generated to rotate the rotor 46 in a given direction.

On the other hand, a braking force can be generated at the electric motor 41. In order to perform a braking control to generate the braking force at the electric motor 41, specifically, all of the first switching elements F1, F2, and F3 are switched on or all of the second switching elements F4, F5, and F6 are switched on. Here, in the former case, all of the second switching elements F4, F5, and F6 are switched off in synchronization with switching on of the first switching elements, and in the latter case, all of the first switching elements F1, F2, and F3 are switched off in synchronization with switching on of the second switching elements. In this manner, this process generates a closed circuit in the driving circuit 90 to cause the electric motor 41 to work as a generator. As a result, the rotor 46 becomes hardly rotatable with respect to the stator core 45 (see FIG. 2), thereby causing the electric motor 41 to generate a braking force.

Here, the magnitude of the braking force generated by forming the above closed circuit is determined by the magnitude of an induced current which is generated at each of the U-phase coil 44u, V-phase coil 44v, and W-phase coil 44w as a result of rotation of the permanent magnet 47 (see FIG. 2). In other words, the faster the rotor 46 rotates, the larger the induced current is and therefore the larger the braking force is.

In addition, the controller 80 and the switches and sensors electrically connected to the controller 80, which are shown in FIG. 4, the driving circuit 90 and the electric motor 41 controlled by the driving circuit 90, which are shown in FIG. 5, collectively constitute the control apparatus for controlling the opening and closing unit for vehicle according to the present invention.

Next, the operation of the controller 80 will be described in detail with reference to the drawings.

Figure 6:
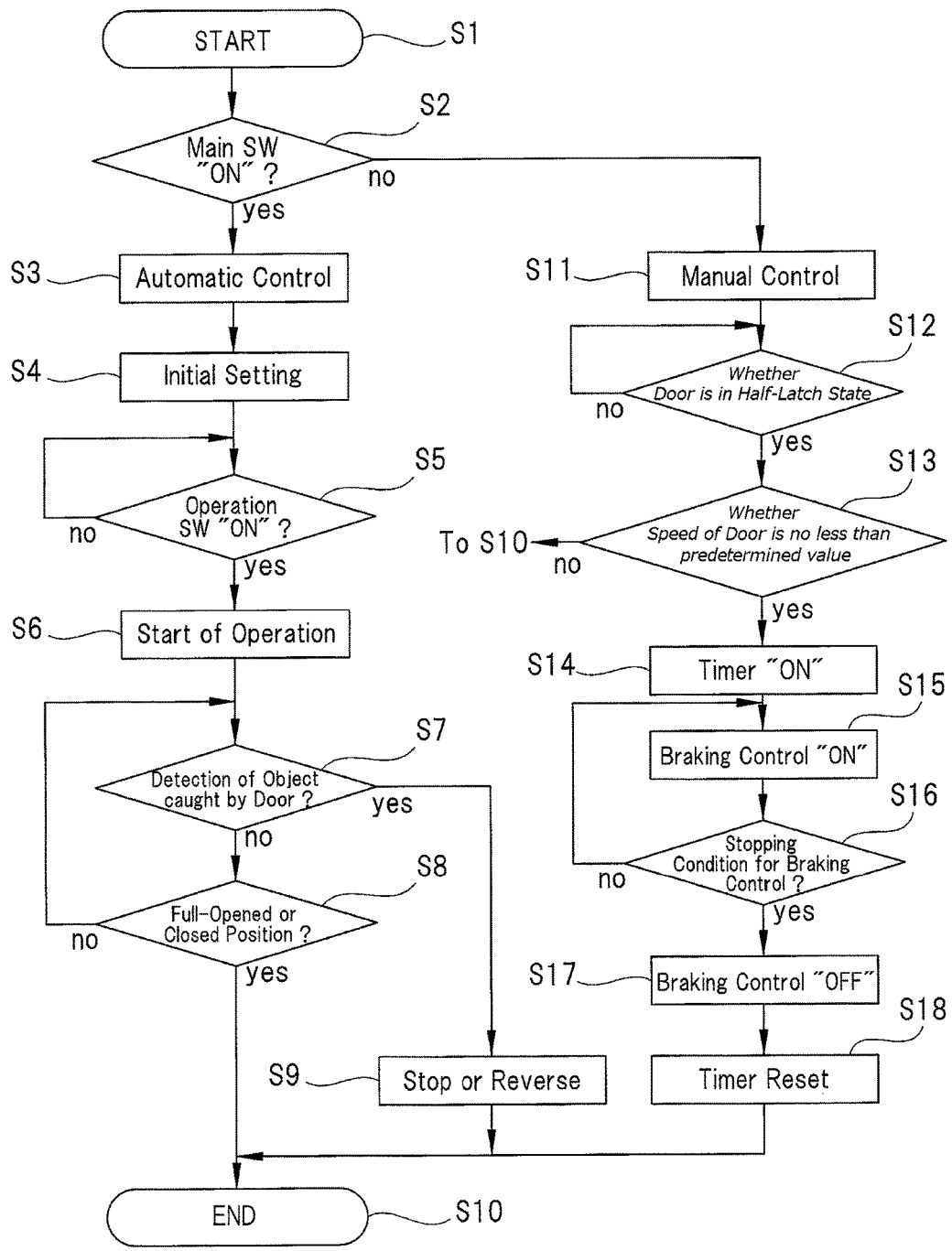
FIG. 6 is a flowchart explaining the details of operation of the control apparatus.
Figure 7:
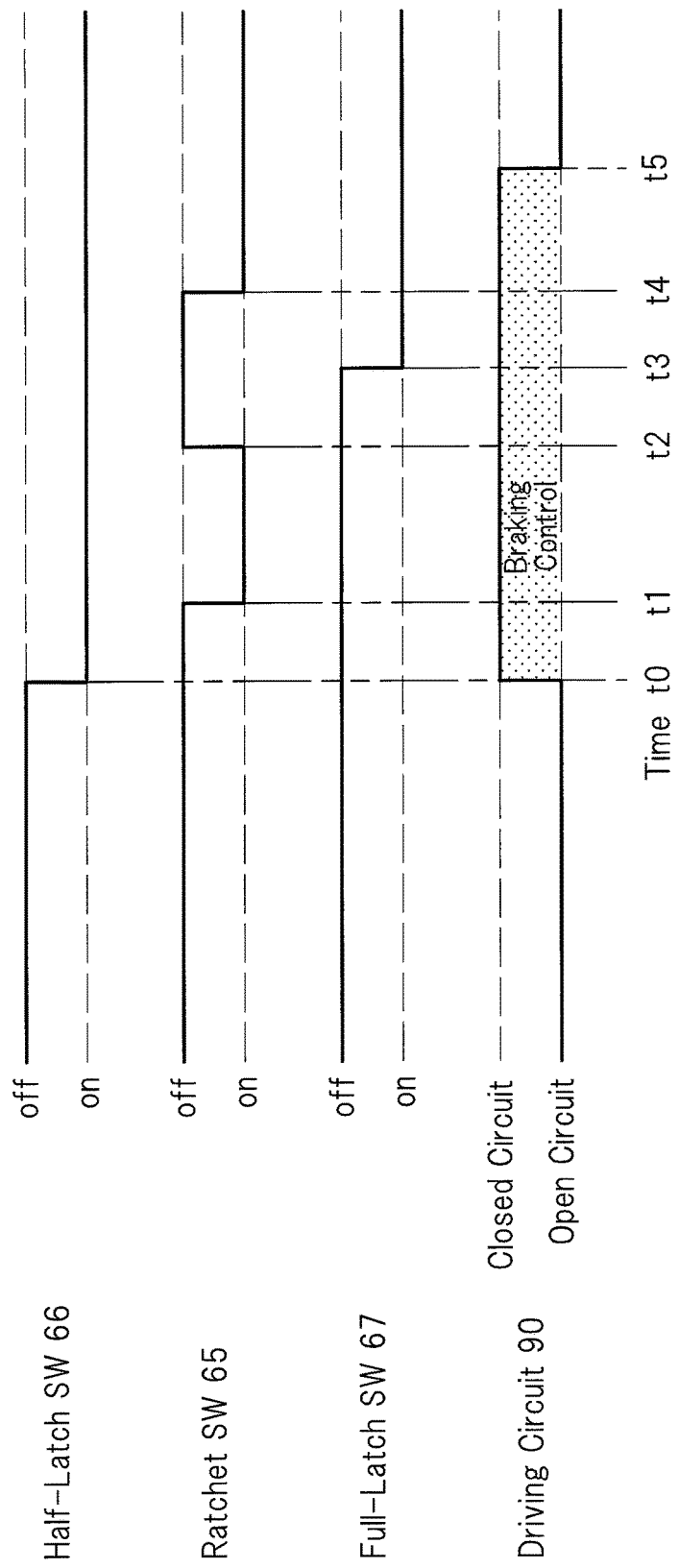
FIG. 7 is a timing chart explaining timing of switching control of the electric motor.

FIG. 6 is a flowchart explaining the details of operation of the control apparatus, FIG. 7 is a timing chart explaining timing of switching control of the electric motor, and FIG. 8 is a comparison table showing numerical values which compare the case of performing braking control with the case of not performing the braking control.

As shown in FIG. 6, in step S1, the driver turns on an ignition switch (not shown) to supply power to the sliding door opening and closing mechanism 15, controller 80, etc. In step S2 following step S1, the CPU 81 judges whether the main switch 82 is switched on. When the CPU 81 judges that the main switch 82 is switched on ("yes"), the process flow proceeds to step S3. When the CPU 81 judges that the main switch 82 is switched off ("no"), the process flow proceeds to step S11. In step S3, [automatic control] mode is established, which is followed by step S4. In step S11, [manual control] mode is established, which is followed by step S12.

In step S4, system settings including a detection signal from the rotation sensor 50 which is saved in the previous control cycle are reset to initialize the controller 80. This allows the sliding door 12 to be opened and closed by the electric motor 41. In step S5 following step S4, the CPU 81 judges whether the operation switch 83 is switched on. When the CPU 81 judges that the operation switch 83 is switched on ("yes"), the process flow proceeds to step S6. On the other hand, when the CPU 81 judges that the operation switch 83 is switched off ("no"), the process of step S5 is repeated.

In step S6, on the basis of a signal from the operation switch 83, the CPU 81 outputs the control signals O1 to O6 from the control signal output unit 86 to the driving circuit 90, where each of the switching elements F1 to F6 is switched on and off. As a result, the electric motor 41 of the driving unit 20 starts operating. The electric motor 41 thus rotates in the normal direction or the reverse direction, causing the sliding door 12 to move in the opening direction or in the closing direction on the basis of the operation of the operation switch 83, as shown in FIG. 1. Whether the electric motor 41 is being rotated in the normal direction or the reverse direction is judged by the CPU 81, which, for example, detects the on-state of the full-latch switch 67 (door being closed) or the off-state of the same (door being opened) during the process of step S6, judges whether the electric motor 41 is rotating in the normal direction or the reverse direction.

In step S7 following step S6, the CPU 81 judges whether an object is caught by the sliding door 12 (when the door is closed). When the CPU 81 judges that no object caught in the sliding door 12 is detected ("no"), the process flow proceeds to step S8. When the CPU 81 judges that an object caught in the sliding door 12 is detected ("yes"), the process flow proceeds to step S9. An object caught in the sliding door 12 is detected by a pressure detecting switch PS (see FIG. 1) disposed on the front end of the sliding door 12. The pressure detecting switch PS, which is not shown in detail, is also electrically connected to the CPU 81 via the interface of the controller 80.

In step S8, the CPU 81 judges whether the sliding door 12 reaches a fully-opened position thereof or a fully-closed position thereof. When the judgment "yes" is made in step S8, the process flow proceeds to step S10 in which [automatic control] is ended. On the other hand, when the judgment "no" is made in step S8, the processes of steps S7 and S8 are repeated.

In step S9, when detecting an object caught in the sliding door 12, the CPU 81 executes a process of stopping the electric motor 41 or a process of slightly rotating the electric motor 41 in the reverse direction. This process prevents an object's being caught in the sliding door 12, after which the process flow proceeds to step S10.

The fully-opened position of the sliding door 12 is detected by the CPU 81 such that the CPU 81 judges the rotation state of the electric motor 41 on the basis of a detection signal from the rotation sensor 50, to detect the fully-opened position. Specifically, when the sliding door 12 is mechanically brought to a stop at its fully-opened position thereof, the rotor 46 (see FIG. 12) is brought to a stop despite the fact that the electric motor 41 is supplied with a driving current. By detecting this state, the CPU 81 detects the fully-opened position of the sliding door 12.

The fully-closed position of the sliding door 12 is detected by the CPU 81 such that the CPU 81 monitors the sequential actions of the door lock device 60 shown in FIGS. 3A, 3B, and 3C to detect the fully-closed position. The operation of the door lock device 60 will be then described in detail with reference to FIGS. 3 and 7.

The move of the sliding door 12 in the closing direction causes the striker 61 to shift from a position (1) to a position (2), as shown in FIG. 3A, and this means that the striker 61 slips into the notch 63a. As a result, the latch member 63 is rotated clockwise around the pivot C1.

The clockwise rotation of the latch member 63 causes the striker 61 to shift from the position (2) to a position (3), that is, causes the striker 61 to come deep into the notch 63a, as shown in FIG. 3B, which causes the latch member 63 to rotate further clockwise around the pivot C1. As a result, the latch member 63 switches on the half-latch switch 66 (at time t0 in FIG. 7). Following this, the ratchet lever 64 is rotated clockwise around the pivot C2 to bring the front end 64a of the ratchet lever 64 in engagement with the first ratchet engaging portion 63b. As a result, the ratchet switch 65 is also switched on (at time t1 in FIG. 7).

Subsequently, as a result of switching on both the half-latch switch 66 and the ratchet switch 65, the driving motor 68 is rotated in the normal direction, which sticks the closure 69 upward. This results in further clockwise rotation of the latch member 63 around the pivot C1, as shown in FIG. 3C. At this point, the front end 64a and the first ratchet engaging portion 63b are disengaged from each other, which temporarily switches off the ratchet switch 65 (at time t2 in FIG. 7).

Afterward, when the closure 69 is further stuck upward, the striker 61 shifts from the position (3) to a position (4), which switches on the full-latch switch 67 (at time t3 in FIG. 7). Subsequently, the front end 64a is engaged with the second ratchet engaging portion 63c, which switches on the ratchet switch 65 again (at time t4 in FIG. 7). As a result of switching on both full-latch switch 67 and ratchet switch 65, the driving motor 68 is rotated counterclockwise, which puts the closure 69 back to its initial position. This brings the latch member 63 in the full-latch state, thus bringing the sliding door 12 in the fully-closed state (locked state).

In step S12 following step S11, the braking control judging unit 84 judges whether the sliding door 12 is moved in the closing direction, and put in the half-latch state. In this step, the half-latch state (improperly-closed state) of the sliding door 12 with respect to the opening 11 (see FIG. 1) is judged on the basis of an incoming on-signal from the half-latch switch 66. When the half-latch switch 66 is switched on ("yes"), the process flow proceeds to step S13. When the half-latch switch 66 remains off ("no"), the process of step S12 is repeated.

In step S13, the braking control judging unit 84 judges whether the electric motor 41 is being rotated at a speed higher than a predetermined speed (predetermined speed value), that is, judges whether the sliding door 12 is being moved manually at a high speed in the closing direction. Here, since the travel speed of the sliding door 12 is proportional to the rotating speed of the rotor 46 (see FIG. 2) of the electric motor 41, the travel speed of the sliding door 12 can be estimated on the basis of a detection signal from the rotation sensor 50. In other words, the rotation sensor 50 constitutes a travel speed detecting unit for detecting the travel speed of the opening and closing unit according to the present invention. Here, the judgment value (predetermined speed value) in step S13 is set as a travel speed significantly higher than the travel speed of the sliding door 12 driven by the electric motor 41 under [automatic control].

In addition, the travel speed detecting unit for detecting the travel speed of the sliding door 12 is not limited to the above rotation sensor 50. For example, the roller assembly 13 of the sliding door 12 may be provided with a rotation sensor serving as the travel speed detecting unit.

Next, when the judgment "yes" is made in step S13, the process flow proceeds to step S14. On the other hand, when the judgment "no" is made in step S13, and the process flow proceeds to step S10.

In step S14, the timer 85 of the controller 80 is actuated to start counting time (at time t0 in FIG. 7). In step S15 following step S14, a braking control instruction signal BS (see FIG. 4) from the braking control judging unit 84 is input to the CPU 81 which performs a braking control of the electric motor 41 (hatched area in FIG. 7). The braking control instruction signal BS to be output from the braking control judging unit 84 to the CPU 81 is generated by the braking control judging unit 84, on the basis on the judgment "yes" made in steps S12 and S13.

In step S15, specifically, the control signal output unit 86 outputs the control signals O1 to O6 to the driving circuit 90 so that a closed circuit is formed in the driving circuit 90 (see FIG. 5), thereby switching on each of the first switching elements F1, F2, and F3, or switching on each of the second switching elements F4, F5, and F6, so as to cause the electric motor 41 to work as an eclectic generator. In this manner, the electric motor 41 generates a given braking force. Therefore, when the sliding door 12 is manually closed at high speed, a braking force is generated by the electric motor 41 just before the sliding door 12 is about to reach the full-latch state. Consequently, it is possible to effectively reduce the high-speed rotation of the rotor 46 caused by its inertial force, and to almost stop the rotor 46.

In step S16 following step S15, the braking control judging unit 84 makes a judgment on whether the current condition meets a requirement for stopping the controller 80 from performing a braking control for the electric motor 41. Specifically, the braking control judging unit 84 judges whether the current condition meets the requirement by checking whether an elapsed time recorded by the timer 85 exceeds a given time t5 (see FIG. 7). Here, the given time t5 is determined and set to be, for example, 1.0 sec. which is relatively short.

Then, when the judgment "yes" is made in step S16, the braking control judging unit 84 stops sending the braking control instruction signal BS to the CPU 81 in step S17 following step S16, thereby stopping the controller 80 from performing a braking control of the electric motor 41. On the other hand, when the judgment "no" is made in step S16, the processes of steps S15 and S16 are repeated.

In step S18 following step S17, the braking control judging unit 84 clears time data (count values) saved by the timer 85 to reset the timer 85. Subsequently, the process flow proceeds to step S10 in which [manual control] is ended.

Here, as shown in FIG. 8, each of execution and non-execution of braking control by the controller 80 of the electric motor 41 was verified. Numerical values shown in this table of FIG. 8 are values recorded right after the sliding door 12 is moved manually at high speed in the closing direction to switch on the half-latch switch 66, that is, right after time t0 in FIG. 7. This table of FIG. 8 demonstrates that "maximum rotation number (rpm)", "maximum door speed (m/s)", and "maximum cable tension (N)", numerical numbers in the case of "execution of braking control" are smaller than those in the case of "non-execution of braking control", and the former numerical numbers are roughly half of the latter numerical numbers. This leads to the fact that an impact force transmitted to components (speed-reduction mechanism 43, etc.) making up the sliding door opening and closing mechanism 15 is reduced to almost half of the original, and that the braking control of the electric motor 41 is effective in protecting the components from damage.

As described above in detail, according to the first embodiment, the controller 80 allows the sliding door 12 to be opened and closed by driven by the electric motor 41 when the main switch 82 is in the on-state, and performs a braking control to generate a braking force at the electric motor 41 when the main switch 82 is in the off-state and the half-latch switch 66 is in the on-state. Therefore, when the main switch 82 is in the on-state, the sliding door 12 can be opened and closed automatically. On the other hand, when the main switch 82 is in the off-state and the sliding door 12 is closed manually, the half-latch switch 66 is switched on before the sliding door 12 is put in the full-latch state, so that the controller 80 performs a braking control of the electric motor 41. In this manner, even if the casing is not enhanced in rigidity, damage to the components caused by the inertial force of the electric motor 41 generated by the sliding door stopped can certainly be prevented.

Next, the second embodiment will be described in detail with reference to the drawings. In addition, parts the same in function as those of the above-mentioned first embodiment are denoted by the same reference numbers as those of the first embodiment, and the detail explanations thereof are omitted.

Figure 9A:
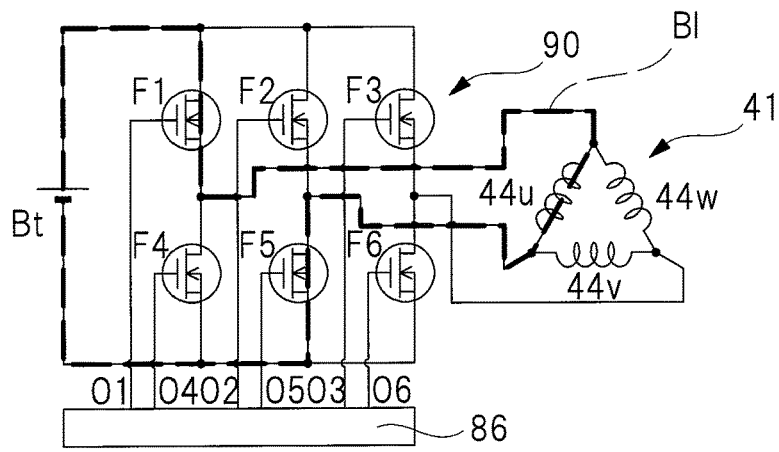
FIGS. 9A to 9C are explanatory diagrams each explaining a states of braking control according to a second embodiment.
Figure 9B:
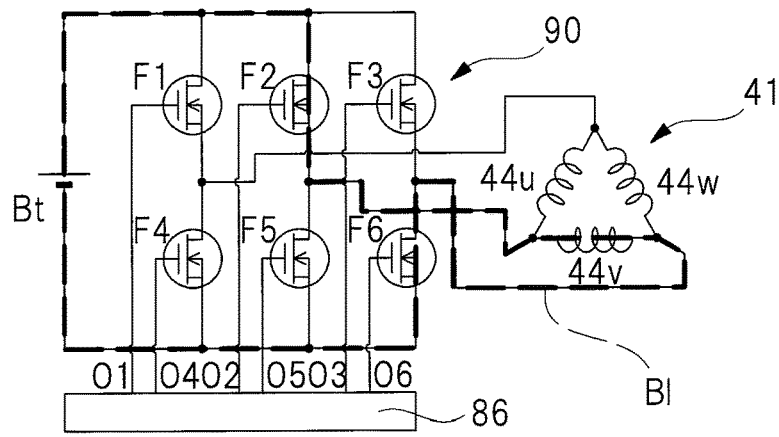
Figure 9C:
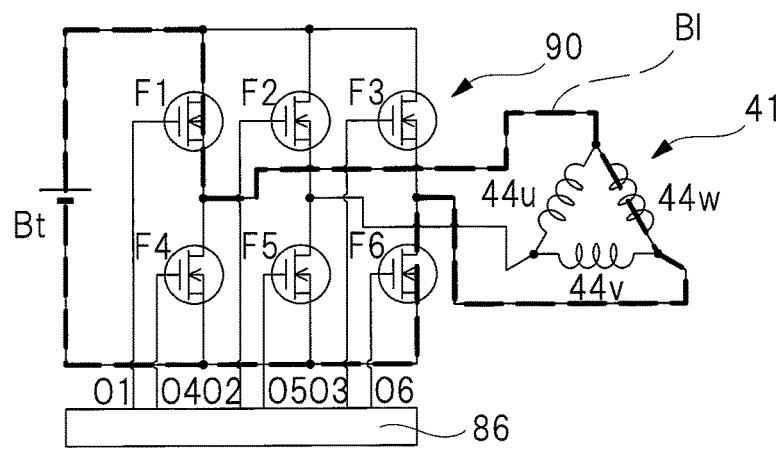

FIGS. 9A to 9C are explanatory diagrams each explaining a state of braking control according to a second embodiment.

The second embodiment is different from the first embodiment only in braking control of the electric motor 41 performed by the controller 80, but other elements and the like of the second embodiment are the same as those of the first embodiment. Specifically, in the first embodiment, a closed circuit is formed in the driving circuit 90 (see FIG. 5) of the electric motor 41, thereby causing the electric motor 41 to generate a braking force.

On the other hand, according to the second embodiment, when the half-latch switch 66 (see FIG. 3) is turned on, that is, when a judgment "yes" is made in step S13 of FIG. 6, the control signal output unit 86 of the controller 80 supplies a braking drive current BI to each of the U-phase coil 44$u$, V-phase coil 44$v$, and W-phase coil 44$w$ which correspond to the respective rotation positions of the rotor 46, as shown in FIGS. 9A, 9B, and 9C.

As a result, a driving force (magnetic attractive force) which tries to stop the rotor 46 is generated at the rotor 46, at which this driving force acts as a strong braking force. The way in which the braking drive current BI is supplied to each of the U-phase coil 44$u$, V-phase coil 44$v$, and W-phase coil 44$w$ is the same as the way in which the driving current is supplied to cause the electric motor 41 to rotate. Specifically, one of the first switching elements F1, F2, and F3 and one of the second switching elements F4, F5, and F6 are switched on so that the braking drive current BI is supplied to one of the U-phase coil 44$u$, V-phase coil 44$v$, and W-phase coil 44$w$ which corresponds to the rotation position of the rotor 46.

Specifically, as shown in FIG. 9A, the first switching element F1 and the second switching element F5 are switched on to supply the braking drive current BI to the U-phase coil 44$u$. As shown in FIG. 9B, the first switching element F2 and the second switching element F6 are switched on to supply the braking drive current BI to the V-phase coil 44$v$. As shown in FIG. 9C, the first switching element F1 and the second switching element F6 are switched on to supply the braking drive current BI to the W-phase coil 44$w$.

As described above, the second embodiment, according to which the braking drive current BI is supplied intentionally to each of the U-phase coil 44$u$, V-phase coil 44$v$, and W-phase coil 44$w$, achieves the same effect as achieved by the above first embodiment according to which a closed circuit is formed to perform braking control. Besides, because the braking drive current BI is supplied intentionally to each of the U-phase coil 44$u$, V-phase coil 44$v$, and W-phase coil 44$w$ to perform braking control utilizing a magnetic attractive force in the second embodiment, the second embodiment offers a braking force stronger than a braking force offered by the first embodiment.

Therefore, the braking force is effective in controlling braking of a large and heavy sliding door, of a large-sized vehicle, etc. By adjusting the size of the braking drive current BI through, for example, duty control, the size of the braking force can be adjusted easily. This allows the same control apparatus to be applied to various sliding doors different in weight and size from each other.

The present invention is not limited to the above embodiments and may be modified into various forms of applications on the condition that the modification does not deviate from the substance of the invention. For example, the U-phase coil 44$u$, V-phase coil 44$v$, and W-phase coil 44$w$ of the electric motor 41 which are connected together by delta wiring are described in the above embodiment, but the coil connection method is not limited to delta wiring. For example, the present invention applies also to an electric motor having the U-phase coil 44$u$, V-phase coil 44$v$, and W-phase coil 44$w$ whose respective ends are connected at a neutral point by star wiring.

The control apparatus for the opening and closing unit for vehicle is used to control the opening and closing unit to open and close an opening formed on the side part of a vehicle.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A control apparatus for controlling a door of a vehicle, comprising:
   an electric motor for driving the door to open and close the door;
   a controller for controlling the electric motor;
   a main switch connected to the controller, and
   a half-latch state detecting switch connected to the controller, and configured to detect whether the door is in a half-latch state, wherein
   when the main switch is in an on-state, the controller allows the electric motor to drive the door to open and close the door, and
   the controller is connected to a rotation sensor for detecting a rotation speed of the electric motor, and the controller calculates a speed of the door,
   when the main switch is in an off-state, the half-latch state detecting switch is in an on-state, and when the speed of the door calculated from the rotation speed of the electric motor is equal to or larger than a predetermined value, the controller performs a braking control to cause the electric motor to generate a braking force,
   the predetermined value is larger than a speed at which the door is moved by the electric motor when the main switch is in the on-state.

2. The control apparatus according to claim 1, wherein the controller has a timer,
   the timer starts to measure an elapsed time when the controller starts to perform the braking control, when the elapsed time exceeds a predetermined value, the controller suspends the braking control.

3. The control apparatus according to claim 1, wherein the electric motor has a plurality of coils, a driving circuit for driving the electric motor has a power supply, a plurality of first switching elements connected to a positive side of the power supply, and a plurality of second switching elements connected to a negative side of the power supply, and the controller performs the braking control by switching on all the first switching elements or all the second switching elements.

4. The control apparatus according to claim 1, wherein the electric motor has a plurality of coils, a rotor, and a rotation sensor for detecting the rotation position of the rotor with respect to the coils, a driving circuit for driving the electric motor has a power supply, a plurality of first switching elements connected to the positive side of the power supply, and a plurality of second switching elements connected to the negative side of the power supply, the controller performs the braking control by switching on the first switching element and second switching element to supply a current to a coil corresponding to the rotation position of the rotor.

* * * * *